United States Patent
Thomas (10) Patent No.: US 7,958,866 B2
(45) Date of Patent: Jun. 14, 2011

(54) METHOD AND SYSTEM FOR CLOSED LOOP LAMBDA CONTROL OF A GASEOUS FUELED INTERNAL COMBUSTION ENGINE

(75) Inventor: Robert J. Thomas, Indianapolis, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 442 days.

(21) Appl. No.: 12/122,596

(22) Filed: May 16, 2008

(65) Prior Publication Data

US 2009/0287392 A1    Nov. 19, 2009

(51) Int. Cl.
   *F02D 41/00* (2006.01)
(52) U.S. Cl. .................................. 123/379; 123/527
(58) Field of Classification Search .................. 123/379, 123/27 GE, 505, 375, 382, 527
See application file for complete search history.

(56) References Cited

U.S. PATENT DOCUMENTS

| | | | |
|---|---|---|---|
| 4,257,378 A * | 3/1981 | Bascle, Jr. ........... | 123/512 |
| 4,377,147 A * | 3/1983 | Bergmann et al. ...... | 123/527 |
| 5,224,345 A | 7/1993 | Schnaibel et al. | |
| 5,267,548 A | 12/1993 | Rosenzopf et al. | |
| 5,450,832 A * | 9/1995 | Graf ................ | 123/515 |
| 5,738,070 A | 4/1998 | Donaldson et al. | |
| 5,787,867 A | 8/1998 | Schnaibel et al. | |
| 6,948,475 B1 | 9/2005 | Wong et al. | |
| 7,003,943 B2 | 2/2006 | Ketterer et al. | |
| 2005/0223696 A1 | 10/2005 | Odendall | |
| 2007/0295000 A1 | 12/2007 | Rodatz et al. | |

FOREIGN PATENT DOCUMENTS

JP    8-158951 A  *  6/1996

* cited by examiner

*Primary Examiner* — Hieu T Vo
(74) *Attorney, Agent, or Firm* — Studebaker & Brackett PC; Tim L. Brackett, Jr.; J. Bruce Schelkopf (57) ABSTRACT

A method and system in accordance with the present invention provides for improved lambda control utility that includes the following: the introduction of an inner control loop to the lambda control based on the pressure of the gaseous fuel downstream of the fuel control valve and upstream of the carburetor relative to the pressure of the air at the inlet of the carburetor, and the introduction of operating point based dynamic parameter scheduling in the lambda feedback control loop. The combination of these enhancements, working together, will allow an engine system to consistently meet the mandated performance requirements via tighter lambda control in the presence of set point changes and load disturbances.

32 Claims, 5 Drawing Sheets

METHOD AND SYSTEM FOR CLOSED LOOP LAMBDA CONTROL OF A GASEOUS FUELED INTERNAL COMBUSTION ENGINE

FIELD OF THE INVENTION

The present invention relates generally to a gaseous fueled internal combustion engine and more particularly to a method and system for providing lambda control for such an engine.

BACKGROUND OF THE INVENTION

Lambda, defined to be the air/fuel ratio divided by the stoichiometric air/fuel ratio, is an important parameter to control on a gaseous fueled internal combustion engine for meeting performance and exhaust gas emissions requirements.

Increasingly stringent exhaust gas emissions requirements have led to the introduction of electronics on spark ignited natural gas engines used in industrial applications. An electronic control module (ECM) based engine control system has been introduced on these products to perform the function of closed loop lambda control on the basis of feedback from an exhaust gas oxygen (EGO) sensor mounted in the exhaust stack.

To adjust lambda, an ECM controlled electrically actuated butterfly type fuel control valve has been introduced into the fuel flow path downstream of the pressure regulator and upstream of the carburetor. The system is such that all fuel admitted to the engine passes through this valve. The introduction of the fuel control valve in this manner introduced engine performance issues. The large volume that exists between the fuel control valve and the EGO sensor introduces significant dynamics into the lambda control loop. As a result, the closed loop lambda control was not able to be tuned aggressively, the fuel control valve position did not change quickly, and engine responsiveness suffered. The engine no longer responded adequately to speed/load transients.

Accordingly, what is desired is a system and method that addresses the above-identified issues. The system and method should be cost effective and easily adaptable to existing engines. The present invention addresses such a need.

SUMMARY OF THE INVENTION

A method and system in accordance with the present invention provides for improved lambda control utility that includes the following: the introduction of an inner control loop to the lambda control based on the pressure of the gaseous fuel downstream of the fuel control valve and upstream of the carburetor relative to the pressure of the air at the inlet of the carburetor, and the introduction of operating point based dynamic parameter scheduling in the lambda feedback control loop. The combination of these enhancements, working together, will allow an engine system to consistently meet the mandated performance requirements via tighter lambda control in the presence of set point changes and load disturbances.

The key features include the utilization of a cascade control paradigm for the regulation of lambda in a carbureted gaseous fueled engine system, the use of the pressure of the gaseous fuel downstream of the fuel control valve and upstream of the carburetor relative to the pressure of the air at the inlet of the carburetor as the inner loop control variable, the use of operating point dependent dynamic parameters in the lambda feedback control loop, and the use of exhaust mass flow to define the engine operating point.

DETAILED DESCRIPTION OF PREFERRED EMBODIMENTS

The present invention relates generally to a device that regulates the pressure of the gaseous fuel at the carburetor inlet relative to the pressure of the air at the carburetor inlet. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
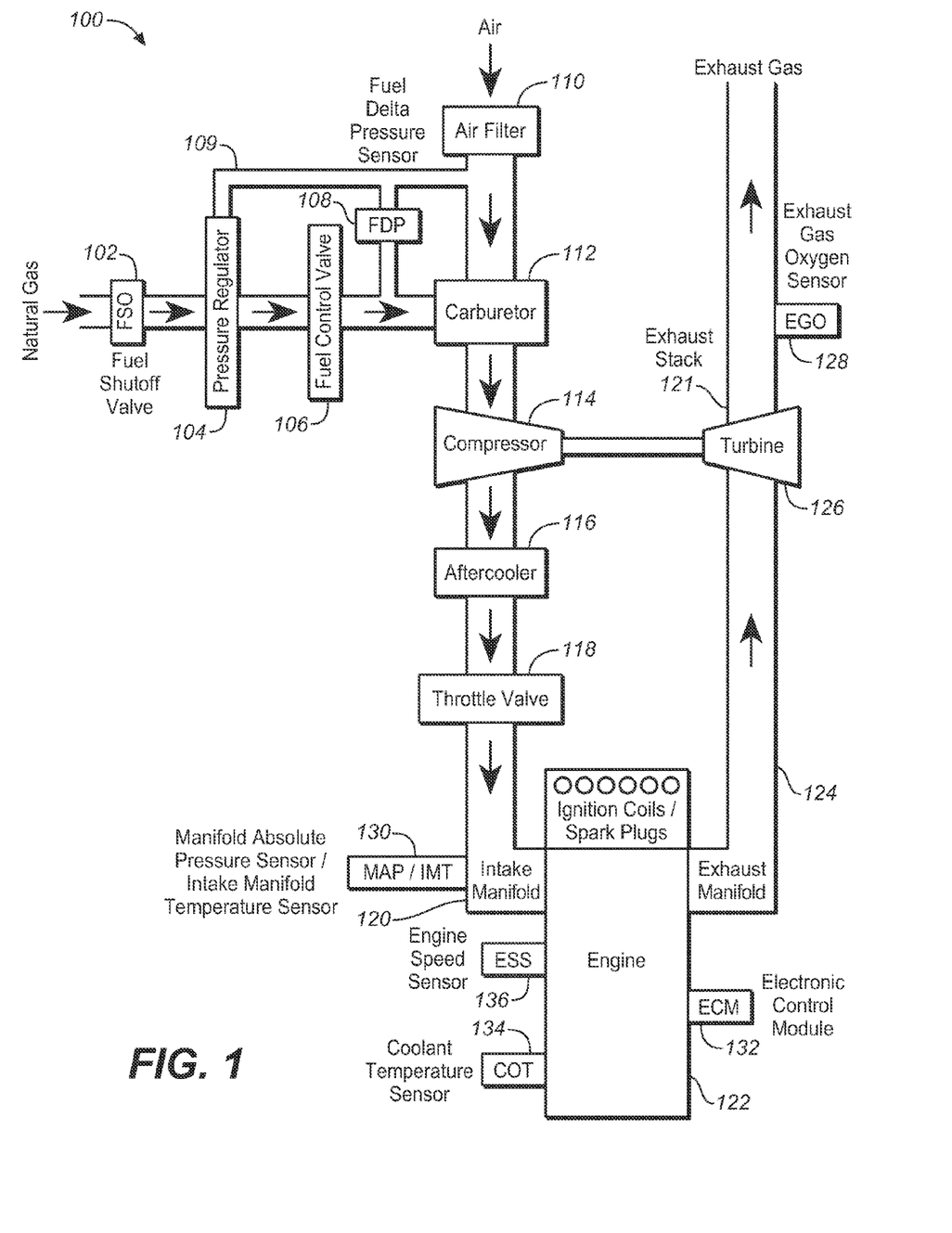
FIG. 1 is a block diagram of a natural gas engine system in accordance with an embodiment.

FIG. 1 is a block diagram of a natural gas engine system 100 in accordance with an embodiment. Although a natural gas engine is described, hereinbelow, one of ordinary skill in the art readily recognizes many types of engines could be utilized, the only requirement being that the engine is gaseous fueled. In this embodiment, the engine system 100 comprises an input of natural gas that is provided through a fuel shut-off valve 102 to a pressure regulator 104. The natural gas continues through a fuel control valve 106 and on to a carburetor 112. Air is provided through an air filter 110 to the carburetor 112. The air and fuel are mixed at the fuel injection point internal to the carburetor 112, forming a mixture referred to as fuel/air charge. The fuel/air charge travels through a compressor 114 to an after cooler 116 and thereafter to a throttle valve 118. The fuel/air charge continues through the intake manifold 120 into the combustion chambers of the engine 122. The combusted fuel/air charge, referred to as exhaust gas, leaves the combustion chambers of the engine 122, entering the exhaust manifold 124. The exhaust gas continues through the turbine 126 and then exits the system through the exhaust stack 121.

The fuel system of the engine 100 includes the following components: the pressure regulator 104, the fuel control valve 106, and an air/fuel mixer, such as carburetor 112.

Although the embodiment described below utilizes a carburetor, a system and method in accordance with the present invention could utilize any air/fuel mixer that has similar characteristics and functionality associated with a gaseous fuel carburetor.

Some of the functionality is that the mixer admits gaseous fuel to the air stream such that the air/fuel ratio of the resulting mixture is controlled across the range of possible air flows for the engine. Furthermore, the design of the mixer is such that control of the pressure of the gaseous fuel at the inlet of the mixer relative to the pressure of the air at the inlet of the mixer is required in order to admit the necessary fuel for optimum air/fuel ratio control of the resulting mixture within a wide range of transient and steady-state operating conditions.

The pressure regulator 104 lies in the fuel flow path upstream of the fuel control valve 106. This device regulates the pressure of the gaseous fuel at the inlet of the fuel control valve 106 relative to the pressure of the air at the carburetor 112 inlet. A balance line 109 is installed between the carburetor 112 and the pressure regulator 104 to provide the air reference pressure to the pressure regulator 104. The fuel control valve 106 is in one embodiment an electrically actuated butterfly type valve that lies in the fuel flow path downstream of the pressure regulator 104 and upstream of the carburetor 112. All fuel provided to the carburetor 112 passes through the fuel control valve 106. The carburetor 112 lies in the fuel flow path downstream of the fuel control valve 106.

The engine 100 has an electronic control module (ECM) 132 based engine control system that performs the function of closed loop lambda control. The traditional approach to the control of lambda on these engines has been to compare the measured lambda (determined on the basis of feedback from an exhaust gas oxygen (EGO) sensor 128 mounted in the exhaust stack 121) to a lambda set point and then to close the loop in a feedback control configuration. The closed loop control generated a fuel control valve 106 position command which varied the fuel available to the carburetor 112. Fuel control valve 106 modulation was performed strictly on the basis of lambda control.

Utilizing the traditional control strategy described above, the system exhibited performance problems, as a change in lambda had to be detected before the fuel control valve position would be adjusted. Furthermore, the fixed dynamic parameters in the lambda control feature, while providing stable steady state operation at all engine operating points, resulted in large lambda excursions in the presence of throttle plate motion. The result was poor transient response, which at times, was unacceptable.

A method and system for providing lambda control in accordance with the present invention provides for the introduction of an inner control loop to the lambda control based on the pressure of the gaseous fuel downstream of the fuel control valve 106 and upstream of the carburetor 112 relative to the pressure of the air at the inlet of the carburetor 112. The method and system further includes the introduction of operating point based dynamic parameter scheduling in the lambda feedback control loop. The combination of these enhancements, working together, has allowed the engine system to consistently meet the mandated performance requirements via tighter lambda control in the presence of set point changes and load disturbances. To describe the features of the present invention in more detail, refer now to the following discussion in conjunction with the accompanying figures.

The first enhancement, the introduction of an inner control loop to the lambda control based on the pressure of the gaseous fuel downstream of the fuel control valve 106 and upstream of the carburetor 112 relative to the pressure of the air at the inlet of the carburetor 112, exploits the operating requirements of the carburetor 112 based fuel system. The carburetor 112 typically requires precise control of the fuel supply pressure to the carburetor 112 relative to the air pressure at the carburetor 112 inlet in order to deliver the necessary fuel for optimum air/fuel ratio control under all transient and steady state operating conditions. It follows that better lambda control can be achieved via control of this pressure.

The engine system 100 design incorporates a fuel differential (or delta) pressure sensor 108 that provides a measurement of this quantity. According, the ECM control law for lambda control was modified via the introduction of an intermediate variable, fuel delta pressure, between lambda and the fuel control valve position.

Figure 2:
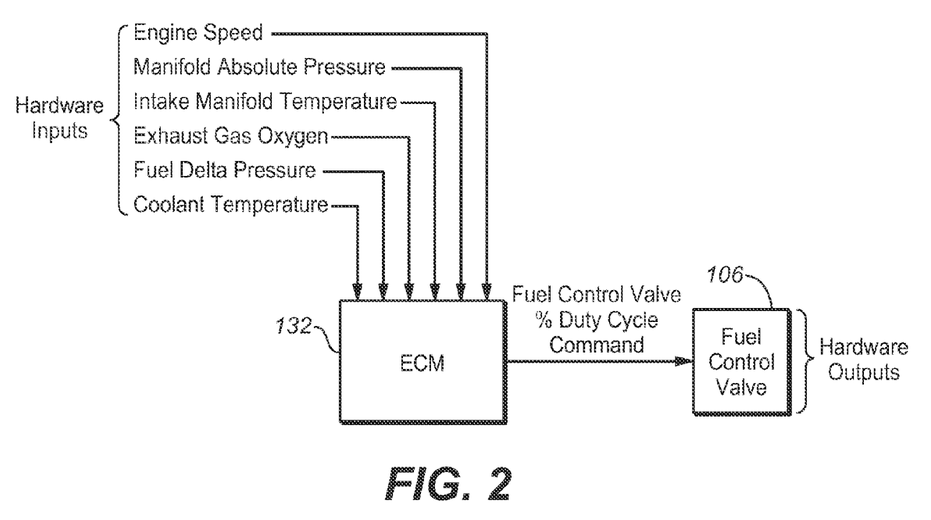
FIG. 2 is a simple block diagram of the ECM and its various inputs and outputs.

FIG. 2 is a simple block diagram of the ECM 132 and its various inputs and outputs. As is seen, hardware inputs are provided to the ECM 132 which in turn provides a fuel control valve command to fuel control valve 106. The ECM 132 includes a lambda control algorithm. A system that utilizes a lambda control algorithm in accordance with the present invention can take the form of an implementation of entirely hardware, entirely software, or may be an implementation containing both hardware-based and software-based elements. In one implementation, this disclosure is implemented in software, which includes, but is not limited to, application software, firmware, resident software, program application code, microcode, etc.

Furthermore, the lambda control algorithm of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 3:
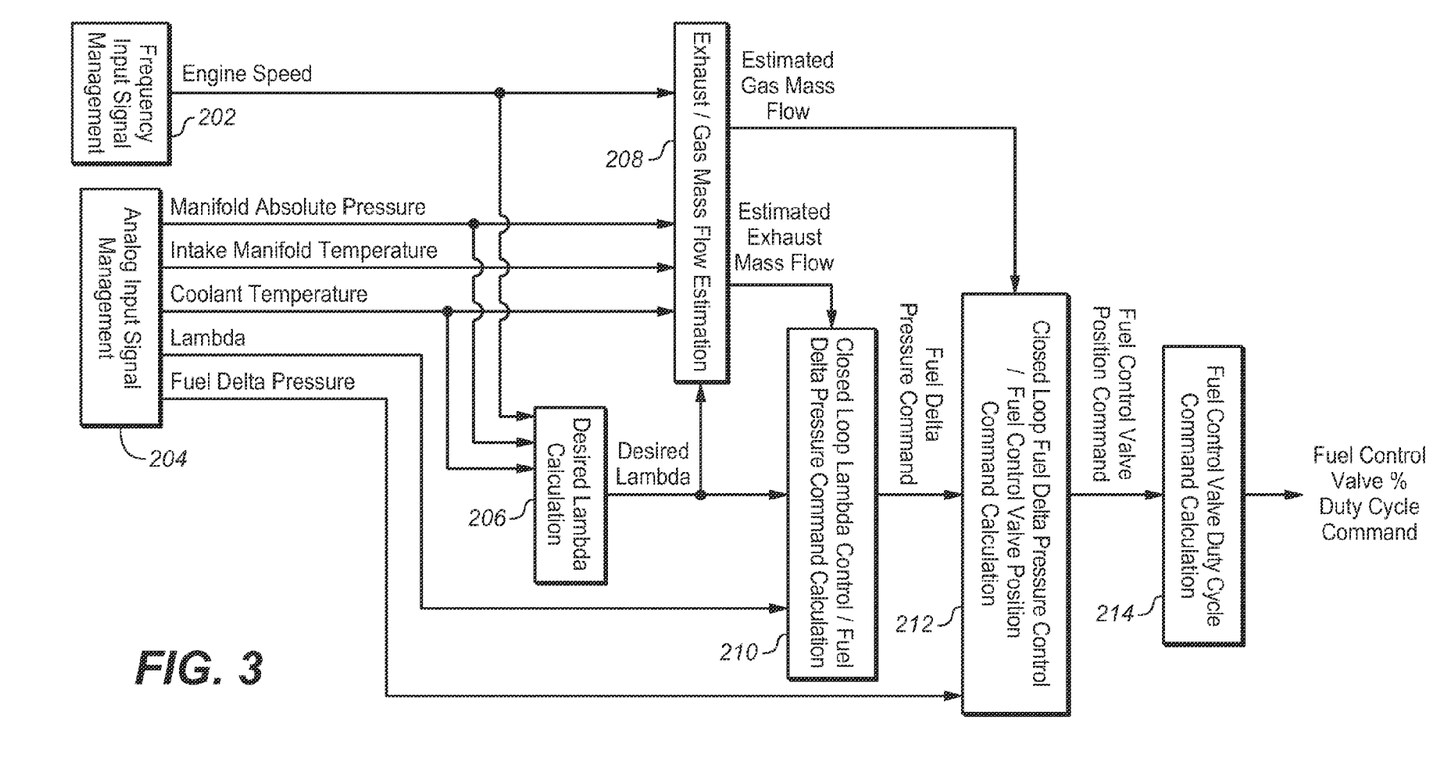
FIG. 3 is a diagram of the lambda control algorithm in accordance with the embodiment.

FIG. 3 is a block diagram of the lambda control algorithm 200 within the ECM 132 in accordance with an embodiment. A frequency input signal management block provides engine speed information to a desired lambda calculation block 206 and an exhaust/gas mass flow estimation block 208. An analog input signal management block 204 provides a manifold absolute pressure signal and a coolant temperature signal to both the exhaust/gas mass flow estimation block 208 and the desired lambda calculation block 206. The analog input signal management block 204 also provides an intake manifold temperature signal to the exhaust/gas mass flow estimation block 208. The output of the desired lambda calculation block 206 is a desired lambda signal which is provided to the exhaust/gas mass flow estimation block 208 and a closed loop lambda control block 210. The exhaust/gas mass flow estimation block 208 provides two output signals. An estimated gas mass flow signal from block 208 is provided to closed loop fuel delta pressure control block 212. An estimated exhaust mass flow signal is provided to closed loop lambda control block 210 The closed loop lambda control block 210 produces a fuel delta pressure command on the basis of the desired lambda, the measured lambda, and the estimated exhaust mass flow. The closed loop fuel delta pressure control block 212 produces a fuel control valve position command on the basis of the fuel delta pressure command, the measured fuel delta pressure, and the estimated gas mass flow. This command is provided to a fuel control valve duty cycle command calculation block 214 which then provides the fuel control valve duty cycle command.

To describe the features of the lamba control algorithm 200 in more detail, refer now to the following description in conjunction with the accompanying figures.

Desired Lambda Calculation Block 206

Figure 4:
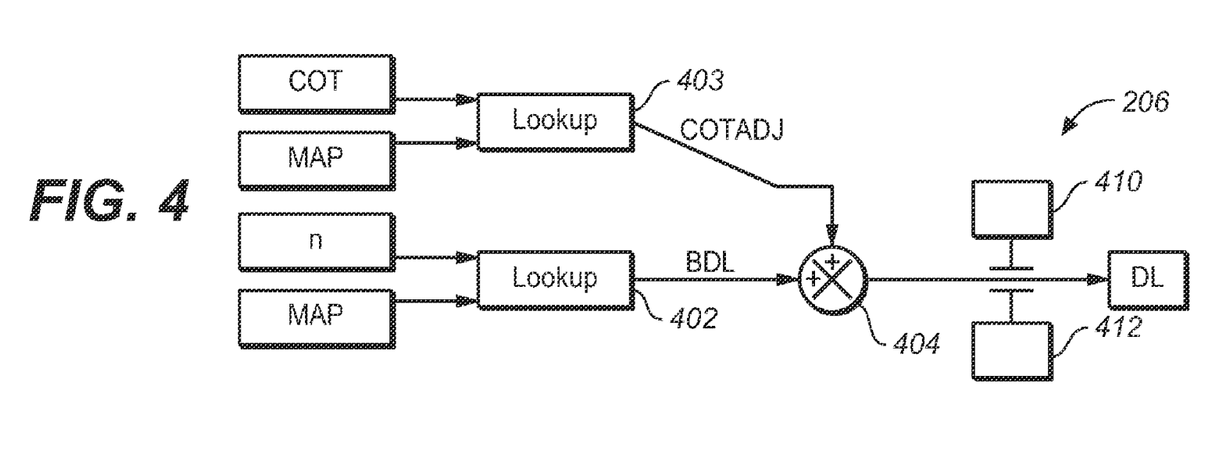
FIG. 4 is a diagram of the desired lambda calculation block.

FIG. 4 is a diagram of the desired lambda calculation block 206. Signals n (engine speed) and MAP (manifold absolute pressure) are input to look-up table 402. Table 402 is a three dimensional table with independent variables corresponding to engine speed (n) and manifold absolute pressure (MAP). The output of table 402 is signal BDL representing base desired lambda. Signals COT (coolant temperature) and MAP (manifold absolute pressure) are input to look-up table 403. Table 403 is a three dimensional table with independent variables corresponding to coolant temperature (COT) and manifold absolute pressure (MAP). The dependent output of table 403 is signal COTADJ representing the coolant temperature based adjustments of the base desired lambda. Signals COTADJ and BDL are summed by adder 404 which outputs signal DL representing desired lambda. Upper limit 410 and lower limit 412 may optionally be included to restrict signal DL to a range of values. Signal DL is output to exhaust/gas mass flow estimation block 208 and the closed loop lambda control/fuel delta pressure command calculation block 210.

Exhaust/Gas Mass Flow Estimation Block 208

A variable VIMT representing intake manifold temperature based volumetric efficiency adjustment is obtained from a lookup table (not shown) having as its single input signal Intake Manifold Temperature (IMT). The lookup table has one independent variable corresponding to IMT, and one output corresponding to an intake manifold temperature based volumetric efficiency adjustment.

A variable VCOT representing coolant temperature based volumetric efficiency adjustment is obtained from a lookup table (not shown) having as its single input signal Coolant Temperature (COT). The lookup table has one independent variable corresponding to COT, and one output corresponding to a coolant temperature based volumetric efficiency adjustment.

Variable EVOL representing base volumetric efficiency is obtained from a lookup table (not shown) having as its inputs, signal n and MAP, corresponding to the table's independent variables representing engine speed and manifold absolute pressure. The lookup table has one output corresponding to base volumetric efficiency. Variables EVOL, VIMT, and VCOT are multiplied by a multiplier (not shown) which outputs signal VOLEF representing temperature-adjusted volumetric efficiency.

Variable CFEMIP representing charge mass flow estimated at the engine intake ports is calculated as follows:

$$CFEMIP=(5.0 \times DSRT \times VOLEF \times MAP)/(CFGSCS \times IMTABS)$$

where: DSRT=engine displacement rate;
VOLEF=volumetric efficiency;
MAP=manifold absolute pressure;
CFGSCS=charge mixture gas constant; and
IMTABS=IMT+459.67.

Variable estimated exhaust mass flow is set equal to CFEMIP.

Variable estimated gas mass flow is calculated as follows:

$$\text{Estimated Gas Mass Flow}=CFEMIP/(1.0+(DL \times STOI))$$

where:
DL=desired lambda
STOI=stoichiometric air/fuel ratio

Independent variables n, MAP, COT, and IMT may be determined with engine sensors (not shown). Also, independent variable VOLEF may be determined from the same-named variable as calculated as discussed above.

Closed Loop Lambda Control/Fuel Delta Pressure Command Calculation Block 210

Figure 5:
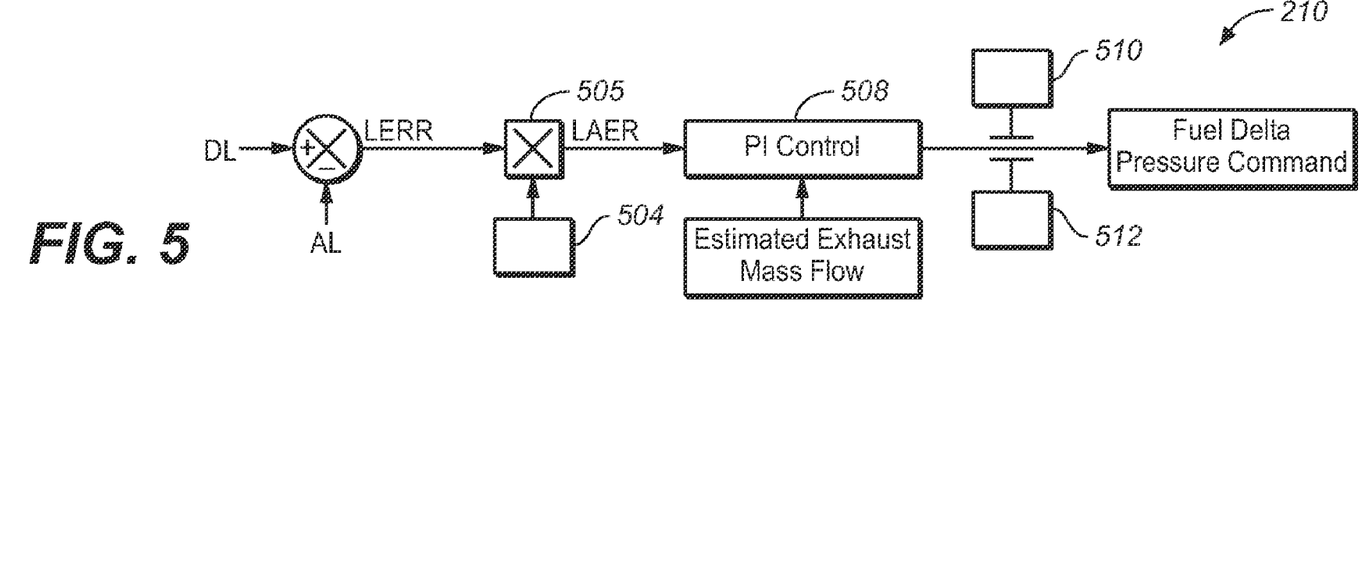
FIG. 5 is a diagram of the closed loop lambda control/fuel delta pressure command calculation block.

FIG. 5 is a diagram of the closed loop lambda control/fuel delta pressure command calculation block 210. As shown in FIG. 5, the desired lambda signal is compared to actual lambda signal to provide an LERR signal. The signal LERR is multiplied with closed loop gain input 504 by multiplier 505. Closed loop gain input 504 is a lambda control closed loop gain that can be a fixed preset value (for example, preprogrammed into firmware, not shown), a modifiable value (for example, a value stored in an EPROM, not shown) and/or can be calculated based on various other operational characteristics (for example, the output of a lookup table, not shown), just to name a few possibilities. The output of multiplier 505 is signal LAER representing closed loop adjusted lambda error. Signal LAER is input to proportional-integral (PI) control 508 which outputs a signal fuel delta pressure command. Internally, PI control 508 may implement lookup tables (not shown) for determining control gains, or upper and lower limits used in the PI computation, with one or more parameters being determined as a function of the estimated exhaust mass flow signal input.

In one example, PI control 508 could internally implement two dimensional lookup tables with independent variables corresponding to estimated exhaust mass flow. Such tables could have dependent outputs representing proportional gain, integral gain, closed loop upper limit, and closed loop lower limit. Other methods as known in the art for implementing PI controls could alternately be used.

Still referring to FIG. 5, upper limit 510 and lower limit 512 may optionally be included to restrict signal fuel delta pressure command to a range of values. Signal fuel delta pressure command is output to closed loop fuel delta pressure control/fuel control valve position command calculation block 212.

Closed Loop Fuel Delta Pressure Control/Fuel Control Valve Position Command Calculation 212

Figure 6:
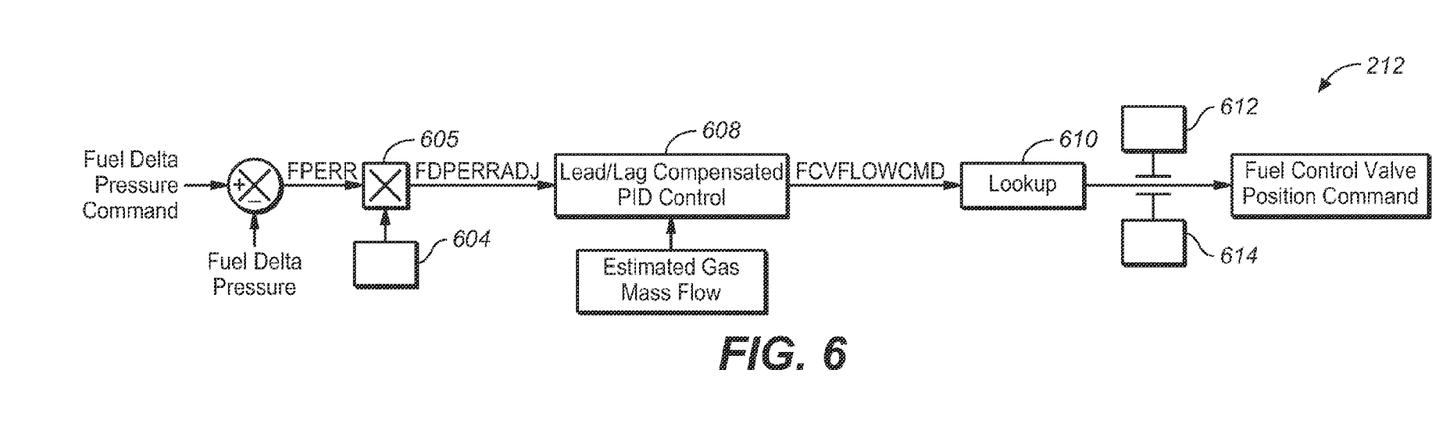
FIG. 6 is a diagram of the closed loop fuel delta pressure control/fuel control valve position command calculation block.

FIG. 6 is a diagram of the closed loop fuel delta pressure control/fuel control valve position command calculation block 212. As shown in FIG. 6, the fuel delta pressure command signal is compared to the fuel delta pressure signal to provide an FPERR signal. The FPERR signal is multiplied with closed loop gain input 604 by multiplier 605. Closed loop gain input 604 is a fuel delta pressure control closed loop gain that can be a fixed preset value (for example, preprogrammed into firmware, not shown), a modifiable value (for example, a value stored in an EPROM, not shown) and/or can be calculated based on various other operational characteristics (for example, the output of a lookup table, not shown), just to name a few possibilities. The output of multiplier 605 is signal FDPERRADJ representing closed loop adjusted fuel delta pressure error. Signal FDPERRADJ is input to lead/lag compensated proportional-integral-derivative (PID) control 608 which outputs signal FCVFLOWCMD representing fuel control valve percent flow command. Internally, Lead/Lag Compensated PID control 608 may implement lookup tables (not shown) for determining control gains or filter time constants used in the Lead/Lag Compensated PID computation, with one or more parameters being determined as a function of the estimated gas mass flow signal input.

In one example, Lead/Lag Compensated PID control 608 could internally implement two dimensional lookup tables with independent variables corresponding to estimated gas mass flow. Such tables could have dependent outputs representing proportional gain, integral gain, derivative gain, derivative low pass filter time constant, lead/lag filter numerator time constant, and lead/lag filter denominator time constant. Other methods as known in the art for implementing Lead/Lag Compensated PID controls could alternately be used.

Still referring to FIG. 6, the fuel control valve percent flow command FCVFLOWCMD is input to lookup table 610. Lookup table 610 is a two-dimensional table with one independent variable corresponding to fuel control valve percent flow command and one dependent output which is the fuel control valve position command. Upper limit 612 and lower limit 614 may optionally be included to restrict signal fuel control valve position command to a range of values. The fuel control valve position command signal is provided to fuel control valve duty cycle command calculation block 214.

Fuel Control Valve Duty Cycle Command Calculation Block 214

Figure 7:
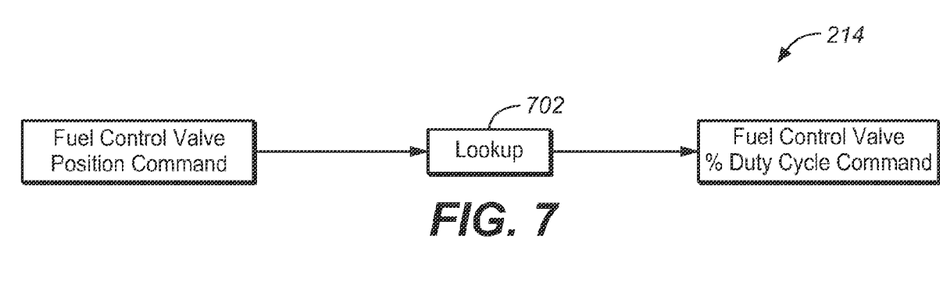
FIG. 7 is a diagram of the fuel control valve duty cycle command calculation block.

FIG. 7 is a diagram of the fuel control valve duty cycle command calculation block 214. As shown in FIG. 7, a fuel control valve position command signal is input to lookup table 702. Lookup table 702 is a two-dimensional table with one independent variable corresponding to fuel control valve position command and one dependent output which is a signal representing the fuel control valve percent duty cycle command. As illustrated in FIG. 2, the fuel control valve is responsive to signal fuel control valve % duty cycle command Referring back to FIGS. 1 and 3 together, this cascade control algorithm 200 features an inner control loop for fuel delta pressure and an outer control loop for lambda. The fuel control valve position command is continuously modified to drive the difference between the fuel delta pressure set point and the measured fuel delta pressure to zero. The set point for the fuel delta pressure control inner loop is continuously modified to drive the difference between the lambda set point and the measured lambda to zero. Given the aforementioned air/fuel ratio control characteristics of the carburetor 112, this enhancement provides tighter control of lambda, especially during transients, since the fuel delta pressure sensor 108 will respond much more quickly to changes in throttle plate position 118, carburetor 112, fuel control valve position 106, and pressure regulator 104 position than will the EGO sensor 128. Accordingly, desired lambda is provided by taking a plurality of parameters, i.e., engine speed, manifold absolute pressure, and coolant temperature, calculating the desired lambda by the desired lambda calculation block 206. This value is utilized by the estimation block 208 and the closed loop lambda control block 210.

As before mentioned, the fuel delta pressure signal is utilized in the inner loop to control the fuel control valve. In so doing, the transient response is superior to the response of the system where the exhaust gas oxygen sensor 128 alone is used to control the fuel control valve 106 since sensor 108 is close in proximity to the fuel system. Since the fuel delta pressure sensor 108 is close in proximity to the fuel system, it will detect a change in operating conditions of the fuel system, and adjust the position of the fuel control valve 106 to compensate before the effects of the change can be detected by the EGO sensor 128.

The second enhancement, the introduction of operating point based dynamic parameter scheduling in the lambda feedback control loop, allows for optimization of lambda control performance across the entire engine operating map. The dynamic parameters in the lambda control feature are scheduled as a function of mass flow through the engine to account for the operating point related variation in mixing dynamics and transport time delays that exist between the fuel control valve 106 and the exhaust gas oxygen sensor 128. A sensor 130 to measure the absolute pressure and temperature in the intake manifold is added to the system to allow for this enhancement. These measurements, along with the engine speed measurement via engine speed sensor 136 and coolant temperature measurement via sensor 134, are utilized to estimate the mass flow through the engine.

The two enhancements work together to dramatically improve the lambda control capability of the system, especially in the presence of set point changes and load disturbances. When the throttle plate 118 opens rapidly due to desired engine speed increase or engine load application, the air flow through the carburetor 112 increases quickly, producing an increase in the pressure drop across the carburetor 112 gas valve, as well as a change in the carburetor 112 gas valve position to increase fueling in response to the mechanically sensed increase in air flow. The combined effect is a drop in the fuel pressure at the carburetor 112 inlet. This drop is detected by the fuel delta pressure sensor 108. The inner control loop responds to this drop in pressure by increasing the fuel control valve 106 position command to maintain the fuel delta pressure set point dictated by the lambda control algorithm 200. This is performed before any lambda change has been detected by the exhaust gas oxygen sensor 128. Furthermore, the change in operating point associated with the increased air flow results in shorter air/fuel mixing time constants and shorter transport time delays in the engine system 100, permitting the use of more aggressive dynamic parameters in the lambda control feature (scheduled as a function of engine mass flow) for optimal performance. The result is a much smaller lambda excursion from the set point, and thus much tighter lambda regulation through the transient.

When the throttle plate 118 closes rapidly due to desired engine speed decrease or engine load removal, the air flow through the carburetor 112 decreases quickly, producing a decrease in the pressure drop across the carburetor 112 gas valve, as well as a change in the carburetor 112 gas valve position to decrease fueling in response to the mechanically sensed decrease in air flow. The combined effect is an increase in the fuel pressure at the carburetor 112 inlet. This increase is detected by the fuel delta pressure sensor 108. The inner control loop responds to this increase in sensed pressure by decreasing the fuel control valve 106 position command to maintain the fuel delta pressure set point dictated by the lambda control algorithm 200. This is performed before any lambda change has been detected by the exhaust gas oxygen sensor 128. Furthermore, the change in operating point associated with the decreased air flow results in longer air/fuel mixing time constants and longer transport time delays in the engine system, requiring the use of less aggressive dynamic parameters in the lambda control feature (scheduled as a function of engine mass flow) for optimal performance. The result is a much smaller lambda excursion from the set point, and thus much tighter lambda regulation through the transient.

Alternate Embodiments

The described example is an inline turbocharged spark ignited carbureted natural gas engine with a lean burn combustion system. One of ordinary skill in the art recognizes that a method and system in accordance with the present invention could be included in various embodiments, some of which are described below.

For instance, the engine can include various numbers of combustion chambers (cylinders) in different arrangements (for instance, inline, v). The engine may utilize either a two-stroke or four-stroke operating cycle. The engine can be supercharged, turbocharged or naturally aspirated. The engine may or may not include an exhaust gas recirculation (EGR) control system. The engine can be utilized in automotive (coupled to a transmission) or industrial [compression (coupled to a gas compressor), or electric power generation or CHP (Combined Heat and Power) (coupled to an alternator)] applications.

The engine can feature a lean burn combustion system (as described) or a stoichiometric combustion system. With a stoichiometric combustion system, the wide-range linear EGO sensor is replaced with a switching EGO sensor, and a Three Way Catalyst (TWC) is added downstream of the point where this EGO sensor is mounted. A second switching EGO sensor downstream of the TWC may or may not also be present. A feedback control algorithm suitable for the information provided from the switching EGO sensor(s) would then be utilized in the closed loop lambda control block 210 (FIG. 3).

In another embodiment, the fuel system can introduce fuel via a carburetor upstream of the turbocharger compressor (as in the described system) or at a location upstream of the throttle valve and downstream of the turbocharger compressor. The order of the fuel shut-off valve and the fuel pressure regulator in the fuel flow path may be reversed. The order of the after cooler and the throttle valve in the charge flow path may be reversed.

The method for determining the pressure of the gaseous fuel downstream of the fuel control valve and upstream of the carburetor relative to the pressure of the air at the inlet of the carburetor can be realized by means of a physical fuel delta pressure sensor (as described). Alternately, the method for determining the pressure of the gaseous fuel downstream of the fuel control valve and upstream of the carburetor relative to the pressure of the air at the inlet of the carburetor can be realized by means of a virtual fuel delta pressure sensor. One embodiment of a virtual fuel delta pressure sensor is two physical pressure sensors, one measuring the pressure of the gaseous fuel downstream of the fuel control valve and upstream of the carburetor, the other measuring the pressure of the air at the inlet of the carburetor, with the relative pressure being computed by the ECM. A second embodiment of a virtual fuel delta pressure sensor is one where one or both of the two physical sensors is replaced by an estimated value.

An additional system and method in accordance with the present invention is not limited to spark ignition systems to initiate combustion. Ignition timing or "start of combustion" could be utilized with many spark-based ignition and/or non-spark ignition techniques. In one example, spark ignition is provided by a spark ignition device in the combustion chamber. In another example, there is a prechamber in communication with each main combustion chamber, and each prechamber is provided a fuel/air charge that is relatively rich compared to a fuel/air charge in the main chamber. A spark ignition device in each prechamber is selectively activated to ignite this relatively rich charge and initiate combustion in the corresponding main chamber.

One example of a non-spark technique is micropilot injection ignition; where combustion is timed in relation to the injection of a small quantity of a fuel, such as diesel, kerosene, dimethylether, and/or a different type as would occur to one skilled in the art. For another non-spark technique, a diesel pilot is used to ignite gaseous fuel that is direct injected into the combustion chamber with air or a fuel/air charge provided from the intake manifold. Still another non-spark technique is compression ignition (e.g., HCCI). In further embodiments, non-spark techniques and/or spark techniques can be used alone or in combination to initiate combustion on a system that utilizes this invention. Alternatively or additionally, when a gaseous fuel is used, it should be understood that it can be of any type, such as natural gas, propane, and/or petroleum gas, just to name a few.

Finally, there are other embodiments of the control law that are possible. For instance, the lambda control can be modified to accept a fuel delta pressure command adjustment from another or an additional feedback control loop that uses a different form of technology to achieve exhaust gas emissions control. Examples would be a control loop utilizing feedback from an exhaust gas NOx sensor, a control loop utilizing torque over boost feedback, a control loop utilizing feedback consisting of combustion quality information, possibly provided by a combustion cylinder pressure measurement or equivalent, or other implementation contemplated by the present invention.

CONCLUSION

A system and method in accordance with the present invention resolves the engine responsiveness problem by changing the way the lambda control system operates.

First, an inner feedback control loop has been provided to enhance the lambda control. A fuel delta pressure sensor has been introduced into the system architecture to provide the feedback measurement for this inner control loop. This sensor measures the pressure of the gaseous fuel downstream of the fuel control valve and upstream of the carburetor relative to the pressure of the air at the inlet of the carburetor. The introduction of this inner control loop optimizes the performance of the gas carburetor by ensuring tight control of the fuel pressure at the carburetor inlet relative to the air pressure at the carburetor inlet under all operating conditions. The result is tighter control of lambda in the presence of throttle plate motion, and thus better engine transient performance. Second, dynamic parameter scheduling has been introduced to the lambda control to optimize the performance of the control system at all points in the engine operating envelope. An intake manifold pressure and temperature sensor has been included to provide the necessary information to identify the engine operating point for the purpose of dynamic parameter scheduling.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A fuel system for a gaseous fueled internal combustion engine; the fuel system comprising:
   a pressure regulator;
   a fuel control valve;
   an air/fuel mixer;
   a mechanism for determining the pressure of the gaseous fuel downstream of the fuel control valve and upstream of the air/fuel mixer relative to the pressure of air at the inlet of the air/fuel mixer; and
   an electronic control module for utilizing the mechanism to deliver necessary fuel for the appropriate air/fuel ratio control.

2. The system of claim 1 wherein a set point for the fuel delta pressure is continuously modified to drive the difference between a lambda set point and the measured lambda to zero.

3. The system of claim 1 wherein dynamic parameters are scheduled based upon an engine operating point in a lambda feedback control loop of the engine.

4. The system of claim 3 wherein the dynamic parameters are scheduled as a function of mass flow through the engine to account for operating point related variation in mixing dynamics and transport time delays between the fuel control valve and an exhaust gas oxygen sensor.

5. The system of claim 4 which includes a sensor for measuring absolute pressure and temperature in an intake manifold of the engine to allow for the scheduling.

6. The system of claim 4 wherein a plurality of sensors are utilized for measuring mass flow through the engine.

7. The system of claim 6 wherein the plurality of sensors include an intake manifold temperature and pressure sensor, an engine speed sensor, and a coolant temperature sensor.

8. The system of claim 1 wherein an inner loop of the lambda feedback control loop controls the fuel delta pressure of the fuel system.

9. A fuel system for a gaseous fuel internal combustion engine; the fuel system comprising:
   a pressure regulator;
   a fuel control valve;
   a carburetor;
   a fuel delta pressure sensor for measuring a pressure of the gaseous fuel downstream of the fuel control valve and upstream of the carburetor relative to the pressure of air at an inlet of the carburetor; and
   an electronic control module for utilizing the measurement of the fuel delta pressure sensor to deliver necessary fuel for the appropriate air/fuel ratio control.

10. The system of claim 9 wherein a set point for the fuel delta pressure is continuously modified to drive the difference between a lambda set point and the measured lambda to zero.

11. The system of claim 9 wherein dynamic parameters are scheduled based upon an engine operating point in a lambda feedback control loop of the engine.

12. The system of claim 11 wherein the dynamic parameters are scheduled as a function of mass flow through the engine to account for operating point related variation in mixing dynamics and transport time delays between the fuel control valve and an exhaust gas oxygen sensor.

13. The system of claim 12 which includes a sensor for measuring absolute pressure and temperature in an intake manifold of the engine to allow for the scheduling.

14. The system of claim 12 wherein a plurality of sensors are utilized for measuring mass flow through the engine.

15. The system of claim 14 wherein the plurality of sensors include an intake manifold temperature and pressure sensor, an engine speed sensor, and a coolant temperature sensor.

16. The system of claim 9 wherein an inner loop of the lambda feedback control loop controls the fuel delta pressure of the fuel system.

17. A method for controlling lambda of a gaseous fueled internal combustion engine; the gaseous fueled internal combustion engine including a fuel system, the fuel system including a pressure regulator, a fuel control valve and an air/fuel mixer; the method comprising:
   providing a mechanism for determining the pressure of the gaseous fuel downstream of the fuel control valve and upstream of the air/fuel mixer relative to the pressure of air at the inlet of an air/fuel mixer; and
   utilizing the mechanism to deliver necessary fuel for appropriate air/fuel ratio control.

18. The method of claim 17 wherein a set point for the fuel delta pressure is continuously modified to drive the difference between a lambda set point and the measured lambda to zero.

19. The method of claim 17 wherein dynamic parameters are scheduled based upon an engine operating point in a lambda feedback control loop of the engine.

20. The method of claim 19 wherein the dynamic parameters are scheduled as a function of mass flow through the engine to account for operating point related variation in mixing dynamics and transport time delays between the fuel control valve and an exhaust gas oxygen sensor.

21. The method of claim 20 which includes measuring absolute pressure and temperature in an intake manifold of the engine to allow for the scheduling.

22. The method of claim 20 wherein a plurality of sensors are utilized for measuring mass flow through the engine.

23. The method of claim 22 wherein the plurality of sensors include an intake manifold temperature and pressure sensor, an engine speed sensor, and a coolant temperature sensor.

24. The method of claim 17 wherein an inner loop of the lambda feedback control loop controls the fuel delta pressure of the fuel system.

25. A method for controlling lambda of a gaseous fueled internal combustion engine; the gaseous fueled internal combustion engine including a fuel system, the fuel system including a pressure regulator, a fuel control valve and a carburetor; the method comprising:
   providing a sensor for measuring a pressure of the gaseous fuel downstream of the fuel control valve and upstream of the carburetor relative to the pressure of air at an inlet of the carburetor; and
   utilizing the measurement of the sensor to deliver necessary fuel for appropriate air/fuel ratio control.

26. The method of claim 25 wherein a set point for the fuel delta pressure is continuously modified to drive the difference between a lambda set point and the measured lambda to zero.

27. The method of claim 25 wherein dynamic parameters are scheduled based upon an engine operating point in a lambda feedback control loop of the engine.

28. The method of claim 27 wherein the dynamic parameters are scheduled as a function of mass flow through the engine to account for operating point related variation in mixing dynamics and transport time delays between the fuel control valve and an exhaust gas oxygen sensor.

29. The method of claim 28 which includes measuring absolute pressure and temperature in an intake manifold of the engine to allow for the scheduling.

30. The method of claim 28 wherein a plurality of sensors are utilized for measuring mass flow through the engine.

31. The method of claim 30 wherein the plurality of sensors include an intake manifold temperature and pressure sensor, an engine speed sensor, and a coolant temperature sensor.

32. The method of claim 25 wherein an inner loop of the lambda feedback control loop controls the fuel delta pressure of the fuel system.

* * * * *